(12) United States Patent
Paritsky et al.

(10) Patent No.: US 6,822,750 B2
(45) Date of Patent: Nov. 23, 2004

(54) OPTICAL TRANSDUCERS AND METHODS OF MAKING SAME

(75) Inventors: Alexander Paritsky, Modi'in (IL); Alexander Kots, Ashdod (IL)

(73) Assignee: Phone-Or Ltd., Or-Yehuda (IL)

(*) Notice: Subject to any disclaimer, the term of this patent is extended or adjusted under 35 U.S.C. 154(b) by 310 days.

(21) Appl. No.: 10/096,043

(22) Filed: Mar. 13, 2002

(65) Prior Publication Data
US 2003/0173708 A1 Sep. 18, 2003

(51) Int. Cl.[7] .............................................. G01B 11/14
(52) U.S. Cl. ...................................................... 356/622
(58) Field of Search ................................. 356/614–624, 356/337–343; 250/216, 221, 239; 257/82–99, 432–435

(56) References Cited

U.S. PATENT DOCUMENTS

| | | | |
|---|---|---|---|
| 5,414,247 A | * 5/1995 | Geithman et al. | .......... 219/667 |
| 5,771,091 A | 6/1998 | Paritsky et al. | |
| 5,969,858 A | 10/1999 | Funatsu | |
| 6,091,497 A | 7/2000 | Paritsky et al. | |
| 6,239,865 B1 | 5/2001 | Paritsky et al. | |
| 6,398,425 B2 | * 6/2002 | Williams et al. | .............. 385/89 |
| 6,694,031 B2 | * 2/2004 | Paritsky et al. | ............. 381/172 |

* cited by examiner

Primary Examiner—Tu T. Nguyen
(74) Attorney, Agent, or Firm—G. E. Ehrlich (1995) Ltd.

(57) ABSTRACT

A method of making optical transducers by producing an integrated structure including, in a rectangular matrix array, a plurality of discrete light sources, a plurality of discrete light detectors each laterally spaced from a light source, a light shield in the space between a light source and a light detector for shielding the light detector from direct exposure to the light source, and a transparent plastic potting material embedding the light sources, light detectors and light shield; and cutting the integrated structure, along lines of the matrix, into individual optical units, each including a light source, a light detector, a light shield therebetween all embedded in the transparent plastic potting material, and an optical window for outputting light from the light source and for transmitting to the light detector light reflected back from the light source. Also described are optical units of a structure facilitating mass production of such optical transducers and providing a sturdy construction permitting rough handling.

6 Claims, 8 Drawing Sheets

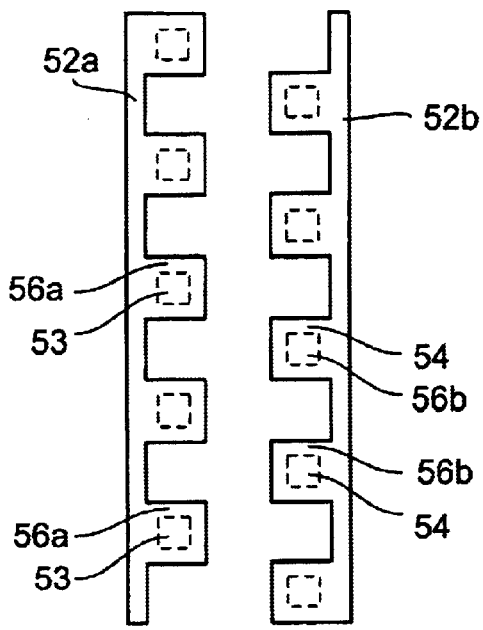
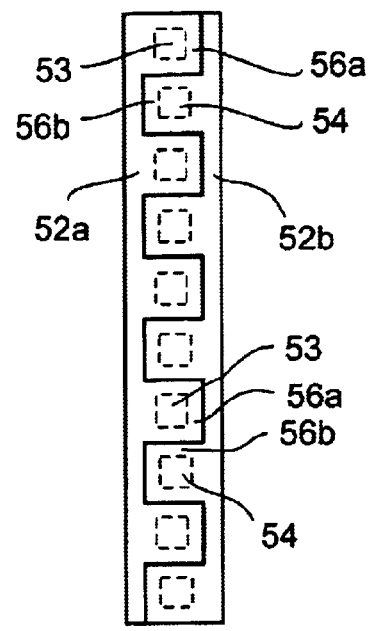
Fig. 12          Fig. 13
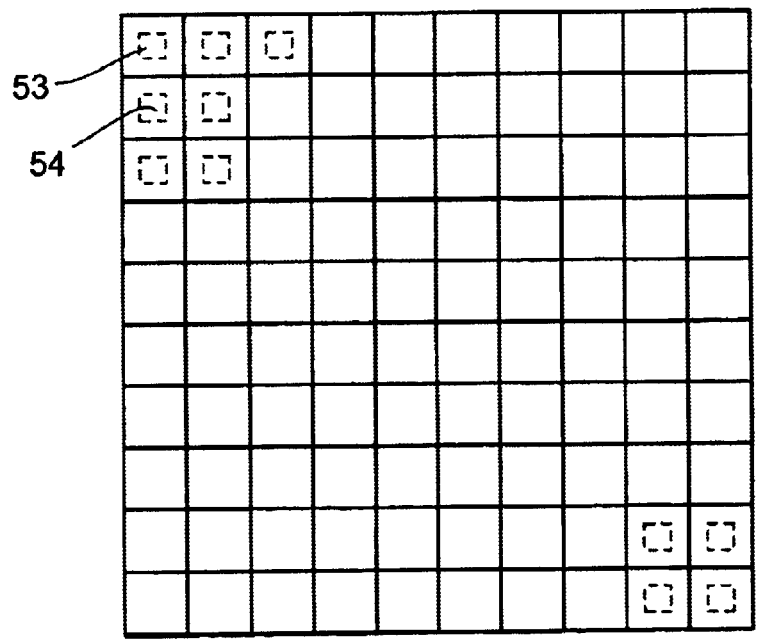
Fig. 14

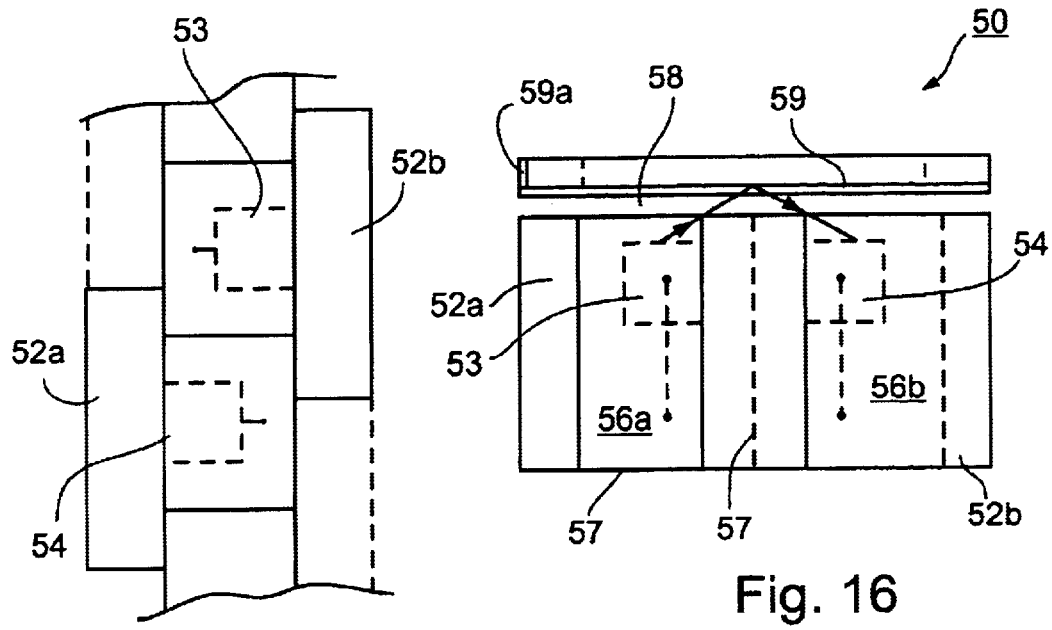
Fig. 15
Fig. 16
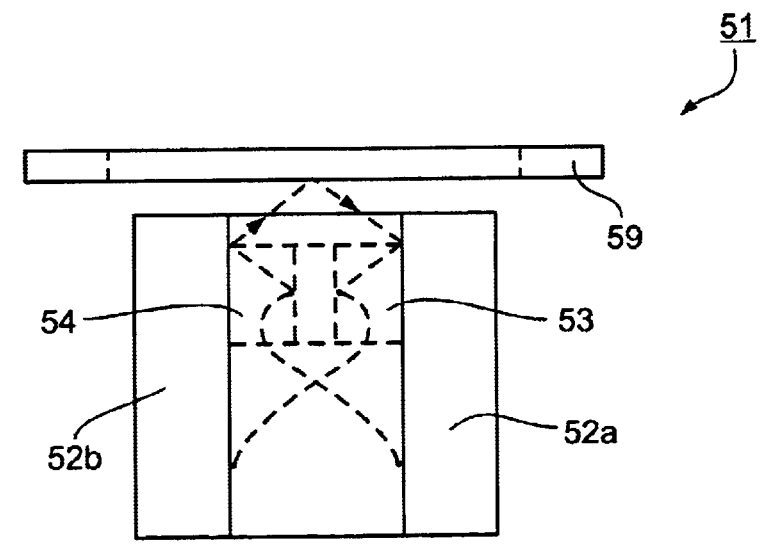
Fig. 17

OPTICAL TRANSDUCERS AND METHODS OF MAKING SAME

FIELD AND BACKGROUND OF THE INVENTION

The present invention relates to optical transducers (sometimes referred to as optical sensors) which utilize optical means for sensing mechanical displacements, such as movements of a body or deformation of a membrane, and converting them to electrical signals. The invention also relates to methods of making such optical transducers. The invention is particularly useful in making optical microphones for converting sound into electrical signals and is therefore described below especially with respect to this application.

Optical transducers of this type are described, for example, in U.S. Pat. Nos. 5,771,091; 5,969,838; 6,091,497; and 6,239,865, the contents of which patents are incorporated herein by reference.

Such optical transducers generally include an optical unit containing a light source, a laterally spaced light detector, an optical shield between the light source and light detector, and a displaceable member aligned with the optical window defined by the light source, light detector, and optical shield between them. The displaceable members in the optical transducers described in the above patents are generally in the form of deformable membranes, but may be physically movable members, such as in an accelerometer. Optical transducers of this type can be constructed to be very accurate for measuring very small displacements.

In general, the known optical transducers do not readily lend themselves to low-cost mass production, and therefore are relatively expense to produce. In addition, many of the known constructions are not sturdy, and therefore are not capable of withstanding rough handling.

OBJECTS AND BRIEF SUMMARY OF THE INVENTION

One object of the present invention is to provide a method of producing optical transducers in a manner which permits mass production at relatively low cost. Another object of the invention is to provide a novel optical transducer of a sturdy construction which is capable of withstanding rough handling.

According to one aspect of the present invention, there is provided a method of making optical transducers, comprising: producing an integrated structure including, in a matrix array, a plurality of discrete light sources, a plurality of discrete light detectors each laterally spaced from a light source, a light shield in the space between a light source and a light detector for shielding the light detector from direct exposure to the light source, and a transparent plastic potting material embedding the light sources, light detectors and light shield; and cutting the integrated structure, along lines of the matrix, into individual optical units, each including a light source, a light detector, a light shield therebetween all embedded in the transparent plastic potting material, and an optical window for outputting light from the light source, and for transmitting to the light detector light reflected back from the light source.

Several embodiments of the invention are described below for purposes of example. In all the described preferred embodiments, the plurality of light sources and light detectors are arrayed in the integrated structure in a rectangular matrix of a plurality of rows along a first orthogonal axis, and a plurality of columns along a second orthogonal axis; the integrated structure being cut along both the orthogonal axes to produce the individual optical units.

In one preferred embodiment of the invention described below, the light sources and light detectors are provided on opposite faces of a common base member with each light detector on a face thereof being in axial alignment with a light source on the opposite face thereof. In this embodiment, the common base member is of light-transparent material and is provided on at least one of its faces with the light shield, in the form of a shielding layer of light-blocking material, before the common base member is provided with the light sources or light detectors. The shielding layer is preferably a light-reflecting coating.

According to further features in this described preferred embodiment, the plurality of light sources on one face of the common base member, and the plurality of light detectors on the opposite face of the common base member, are embedded in separate bodies of the transparent plastic potting material. These bodies are coated with a light-blocking material on all their exposed faces except for one face to serve as the optical window for the respective optical unit.

A further embodiment is described wherein the light sources are provided on one face of a first base member, and the light detectors are provided on one face of a second base member; the first and second base members being bonded together in a back-to-back relation, with the light shield inbetween, to produce the integrated structures. In this embodiment, the first and second base members are of transparent material, and at least one of the base members is provided with the light shield, in the form of a shielding layer of a light-blocking material, before being bonded to the other base member.

Further embodiments are described below wherein the light sources are provided on one face of a first base member and are embedded in one body of the transparent plastic potting material, and the light detectors are provided on one face of a second base member and are embedded in another body of the transparent plastic potting material. At least one of the bodies is provided with the light shield in the form of a shielding layer of a light-blocking material over the transparent plastic potting material. The two bodies of transparent plastic potting material are bonded together to produce the integrated structures with the shielding layer inbetween, and with each light source of the first base member aligned with a light detector of the second base member.

In one described embodiment, the light sources and light detectors are formed in a contiguous relation to each other on their respective base members, and the two base members are bonded together with the outer faces of their respective bodies of transparent plastic potting material in a face-to-face relation to each other, and with each light source of the first base member aligned with a light detector of the second base member in the transverse direction of the integrated structure.

In another described preferred embodiment, the light sources and light detectors are formed in a spaced relation to each other on their respective base members, and the two base members are bonded together with the outer faces of the respective bodies of transparent plastic potting material in a nested relation to each other, with each body of one base member received in a space of the other base member, and with each light source of the first base member aligned with a light detector of the second base member in the transverse direction of the integrated structure.

According to further aspects of the present invention there are provided optical transducers constructed in accordance with the foregoing method. As will be described more particularly below, the foregoing features not only permit the optical units of such transducers to be produced in volume and at lost cost, but also provide a very sturdy construction enabling them to withstand rough handling.

Further features and advantages of the invention will be apparent from the description below.

BRIEF DESCRIPTION OF THE DRAWINGS

The invention is herein described, by way of example only, with reference to the accompanying drawings, wherein:

FIGS. 12–17 illustrate a still further method of making optical transducers in accordance with the present invention, FIG. 12 being a side view illustrating the two base members before being bonded together to produce an integrated structure, FIG. 13 illustrating the two base members after being bonded together as an integrated structure, FIG. 14 being a front view of the so-formed integrated structure, FIG. 15 being an enlarged side view of the integrated structure of FIGS. 13 and 14, FIG. 16 being a sectional view along line XVI—XVI of FIG. 15, and FIG. 17 being an end view of FIG. 15.

DESCRIPTION OF A PRIOR ART CONSTRUCTION (FIG. 1)

Figure 1:
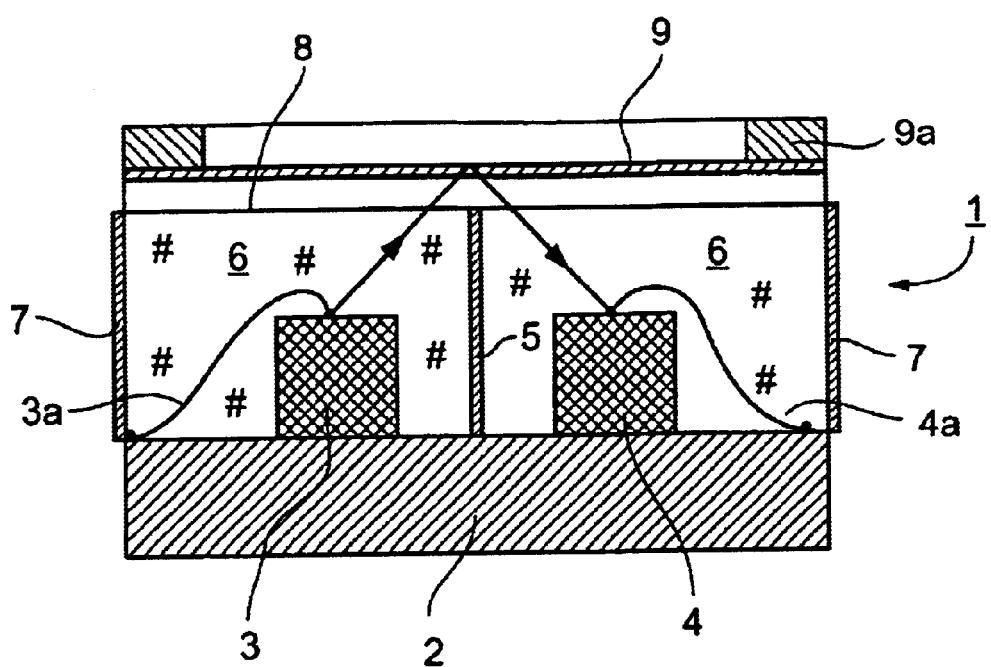
FIG. 1 is a sectional view schematically illustrating a construction of an optical transducer known in the prior art.

The prior art optical transducer schematically illustrated in FIG. 1 includes a base member 2 mounting a light source 3 and a light detector 4 in spaced side-by-side relation. The light source 3 and light detector 4 are optically shielded from each other by a light-blocking member 5, all embedded within a transparent plastic potting material 6.

The outer surface of the transparent plastic potting material 6 carries an external light shielding layer 7, e.g., of a light-reflecting material, such as a film of aluminum or gold, except for the outer face 8 of the transparent plastic potting material 6 overlying the light source 3, light detector 4, and the optical shield 5 between them. The outer face 8 defines an optical window. External light shielding layer 7 optically isolates the light detector 4 from light in the external environment, as well as blocking the passage of light from light source 3 to the external environment.

A displaceable member, in the form of a deformable membrane 9, is mounted by a mounting ring 9a in optical window 8 to overlie the light source 3 the light detector 4 and the light-blocking member 5 embedded in the transparent plastic potting material 6. The surface of membrane 9 facing the optical window 8 is made light-reflecting so as to reflect the light from the light source 3 back to the light detector 4. It will be appreciated that the light is emitted from light source 3 in all directions and is refracted at the interface between the plastic body 6 and the air gap to the membrane 9, such that a substantial amount of the emitted light impinges membrane 9 at an angle, and is thereby reflected back to the light detector 4, as schematically indicated by the arrows in FIG. 1.

The common base may be a printed circuit board (PCB) carrying the electrical connections 3a, 4a to the light source 3 and light detector 4, respectively. Light source 3 may be any suitable light source, such as a light-emitting diode (LED), and light detector 4 may be any suitable light detector, such as a photo diode. Membrane 9 may be any other displaceable body effective to reflect light from light source 3 to light detector 4 in accordance with its changing position or changing configuration. Light-blocking member 5 may carry a light-reflecting coating similar to layer 7.

It will be seen that the light source and the light detector 4 are optically isolated from each other and from the external environment on all surfaces thereof except for the optical window 8 receiving the membrane 9. Thus, the light from light source 3 is reflected from the inner surface of the membrane 9 towards the light detector 4, such that any displacement of the membrane will change the intensity of the light received by the light detector. Accordingly, the light received by the light detector 4 is converted to an electrical signal corresponding to the deformations of membrane 9 and output via electrical connection 4a.

As described in the above-cited patents, optical transducers as illustrated in FIG. 1 are usable in a wide variety of applications involving the detection or measurement of micro-movements or macro-movements, such as in the construction of microphones, hydrophones, accelerometers, pressure/vacuum gauges, temperature sensors, displacement meters, etc.

Such optical transducers, however, require extremely high precision in the manufacture and assembly of their respective parts, since very small dimensional errors can have a large affect on their sensitivity and reliability. This is particularly true with respect to the light-blocking layer 5 which must be very thin and very accurately located. For these reasons, it is very difficult to produce such optical transducers in volume and at relatively low cost.

DESCRIPTION OF PREFERRED EMBODIMENTS OF THE PRESENT INVENTION (FIGS. 2–14)

The present invention relates to novel optical transducer constructions which readily lend themselves to volume production at relatively low cost, and also to novel methods of making such optical transducers.

FIGS. 2–14 of the drawings illustrate several preferred embodiments of the invention. A feature common to all the preferred embodiments of the invention described below is that such optical transducers are made by producing an integrated structure including, in a matrix array, a plurality of discrete light sources, a plurality of discrete light detectors each laterally spaced from a light source, a light shield in the space between a light source and a light detector for shielding the light detector from direct exposure to the light source, and a transparent plastic potting material embedding the light sources, light detectors and light shield; and cutting the integrated structure, along lines of the matrix, into individual optical units, each including a light source, a light detector, a light shield therebetween all embedded in the transparent plastic potting material, and an optical window for outputting light from the light source, and for transmitting to the light detector light reflected back from the membrane or other displaceable member.

More particularly, in all the described embodiments, the plurality of light sources and light detectors are arranged in the integrated structure in the form of a rectangular matrix of a plurality of rows along a first orthogonal axis, and a plurality of columns along a second orthogonal axis; and the matrix is cut along the two orthogonal axes to produce individual optical units, with each including a light source and a light detector laterally spaced from the light source. A displaceable member, such as a deformable membrane, is then mounted over the optical window in each optical unit to overlie, and to be spaced from, the light source and light detector of the respective unit.

Figure 2:
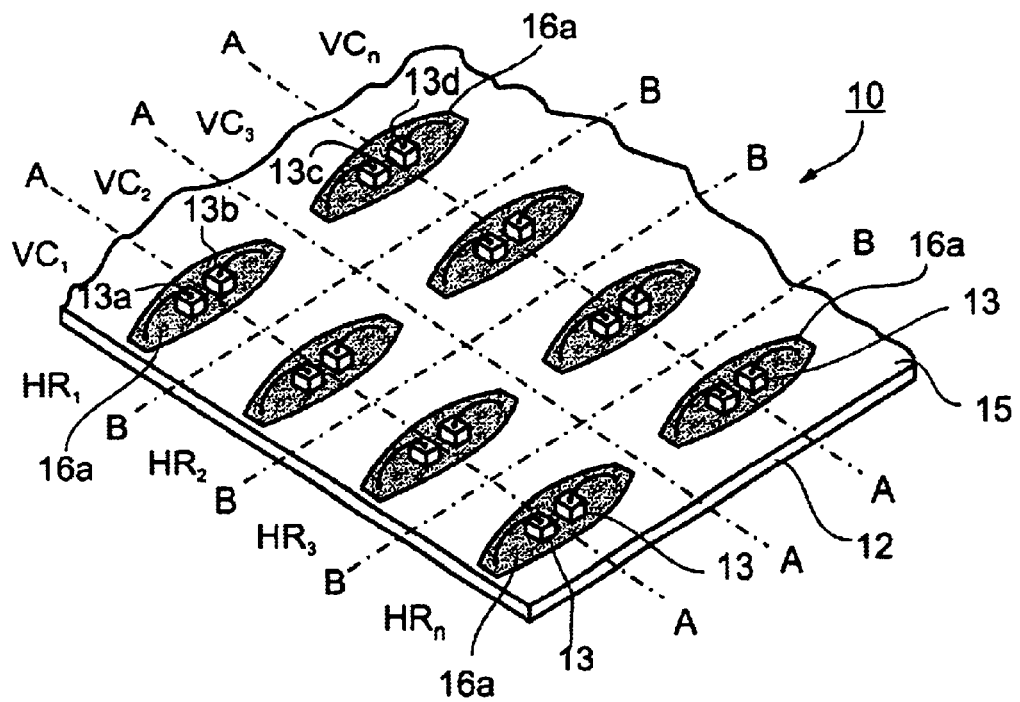
FIGS. 2 and 3 illustrate an intermediate stage in the manufacture of an optical transducer by one method in accordance with the present invention, FIG. 2 being an upper view and FIG. 3 being a lower view, of an intermediate matrix of such transducers before being cut into individual optical units.
Figure 3:
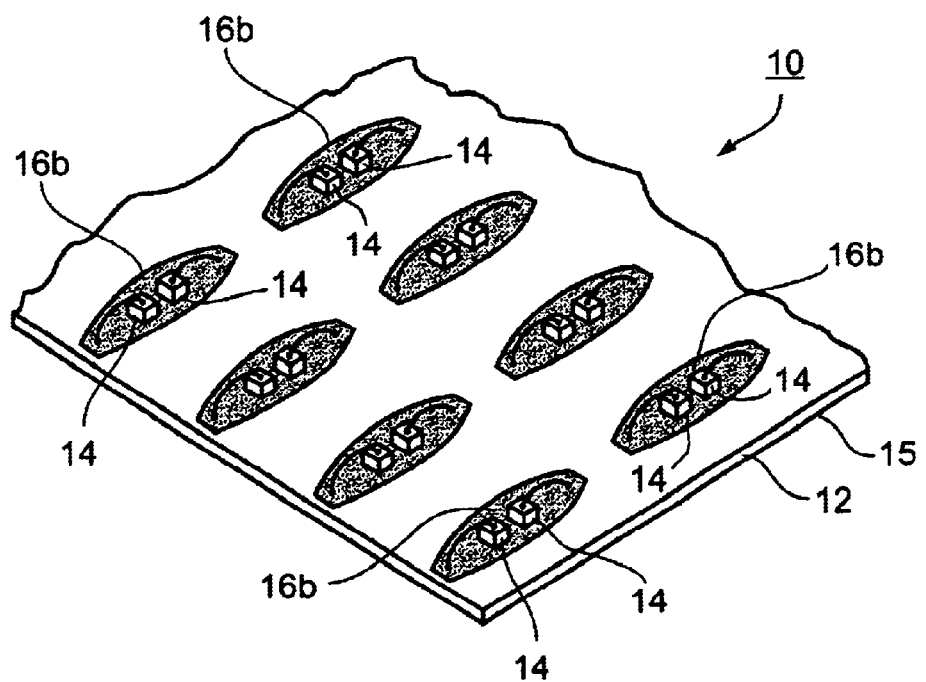
Figure 4:
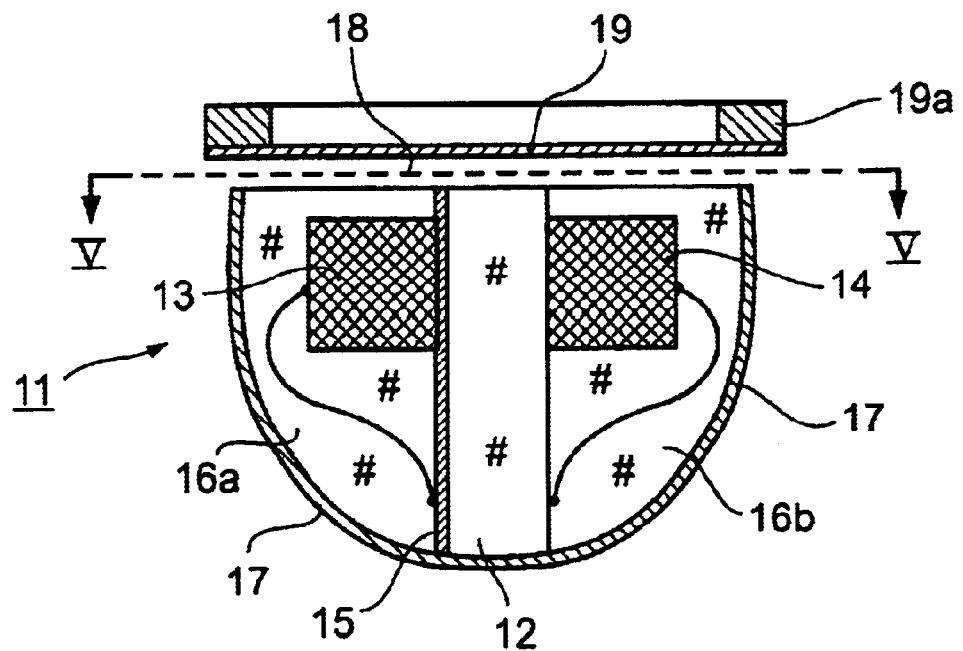
FIG. 4 is a sectional view schematically illustrating one optical transducer constructed from the intermediate matrix of FIGS. 2 and 3.
Figure 5:
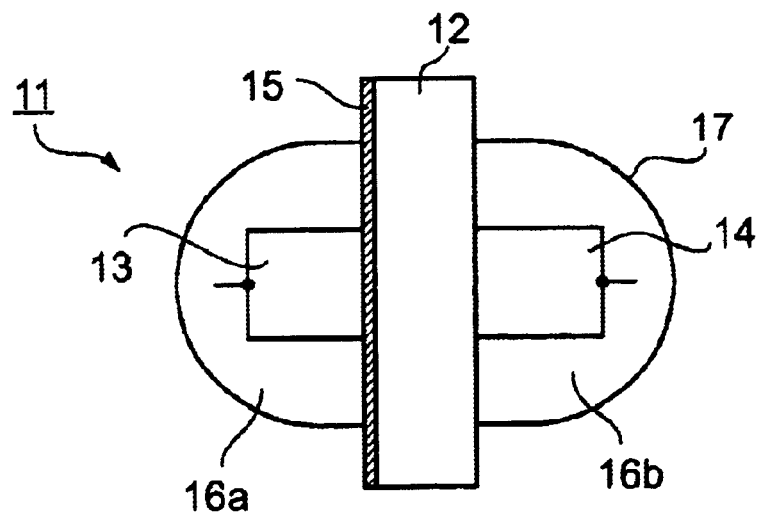
FIG. 5 is a view of the optical transducer of FIG. 4 along line V—V of FIG. 4.

FIGS. 2–5 illustrate one method of making optical transducer in accordance with the invention. FIGS. 2 and 3 illustrate the upper and lower surfaces, respectively, of an intermediate matrix, generally designated 10, produced at one stage in this method of making the optical transducers, while FIGS. 4 and 5 illustrate a single optical transducer made by this method.

With reference first to FIG. 2 which illustrates the upper face of the intermediate matrix 10, it will be seen that this matrix includes a common base member 12, such as a PCB, provided with a plurality of discrete light sources 13 arrayed in a rectangular matrix of a plurality of horizontal rows $HR_1$–$HR_n$ and a plurality of vertical columns $VC_1$–$VC_n$. A shown in FIG. 2, the light sources in each horizontal row are arranged in pairs, e.g., pair 13a, 13b and pair 13c, 13d, with the spacing between the pairs greater than the spacing between the light sources in the respective pair.

As shown in FIG. 3, the opposite face of the PCB 12 is similarly provided with a matrix of light detectors 14, such that each light detector 14 is axially aligned with a light source 13 on the upper face of the printed circuit board 12. Thus, the light detectors 14 would be similarly arrayed in a matrix of horizontal rows and vertical columns, with the light detectors in each horizontal row being arranged in pairs, as the light sources 13 illustrated in FIG. 4.

The PCB 12 is made of a transparent material, and is provided with a light-blocking coating 15 on one face, in this case on the face receiving the matrix of light sources 13, before the light sources 13 are applied thereto. Lightblocking coating 15 serves the same function as lightblocking layer 5 in the prior art optical transducer of FIG. 1, and may be made of the same light-reflecting material as that layer.

As shown in FIG. 2, each pair of light sources (e.g., 13a, 13b) on one face of PCB 12 is embedded in a transparent plastic potting material 16a, such as an epoxy resin. Similarly, each pair of the light detectors 14 on the opposite face of PCB 12, as shown in FIG. 3, is also embedded within a transparent plastic potting material 16b.

After the matrices of light sources 13 and light detectors 14 have been formed on the opposite faces of the PCB 12 as described above, and are embedded in the transparent plastic potting material 16a, 16b, the integrated structure so produced 12 is cut along the vertical lines A—A and horizontal lines B—B of FIG. 2 into individual optical units. Each optical unit so formed thus includes a light source 13 and a light detector 14 laterally spaced from the light source and separated therefrom by the respective section of the transparent PCB 12 and the light-blocking layer 15 of the respective optical unit, all embedded in the transparent plastic potting material 16a, 16b. Such an optical unit may then be coated with a light-reflecting coating 17 as shown in FIGS. 4 and 5, except for the face to define the optical window shown at 18 of FIG. 4.

FIG. 4 is a sectional view illustrating one of the optical units 11 so produced. FIG. 4 also illustrates the deformable membrane 19 applied to the optical unit by the mounting ring 19a, wherein it will be seen that membrane 19 is mounted to the uncoated face of the optical unit defining the optical window 18. FIG. 5 is a top view of the optical unit along line V—V.

Thus, as seen in FIGS. 4 and 5, each of the optical units includes a light source 13 carried over the light shielding layer 15 on one face of the transparent PCB 12, and the light detector 14 mounted on the opposite face of the PCB 12 in axial alignment with the light source 13. FIGS. 4 and 5 further illustrate the transparent plastic potting material 16a embedding the light source 13 on one face of the PCB 12, and the transparent plastic potting material 16b embedding the light detector 14 on the opposite face of the PCB. FIGS. 4 and 5 further illustrate the external shielding layer 17, e.g., of a light reflecting material, on the outer face of the potting materials 16a, 16b and of the respective surface of the transparent PCB 12, so as to optically isolate the light source 13 and light detector 14 with respect to each other, and with respect to the extraneous environment, except for the faces of the light source 13 and light detector 14 facing the optical window 18 and the deformable membrane 19.

The light sources 13 may be LEDs (light-emitting diodes) or other light-generating devices, and the light detectors 14 may be photo diodes or other light-sensitive devices.

It will thus be seen that the optical transducer illustrated in FIGS. 2–5 operates in basically the same manner, as in the prior art optical transducer of FIG. 1, except that it more readily lends itself to low-cost, high-volume production, and also provides a high degree of sturdiness enabling it to withstand rough handling.

Figure 6:
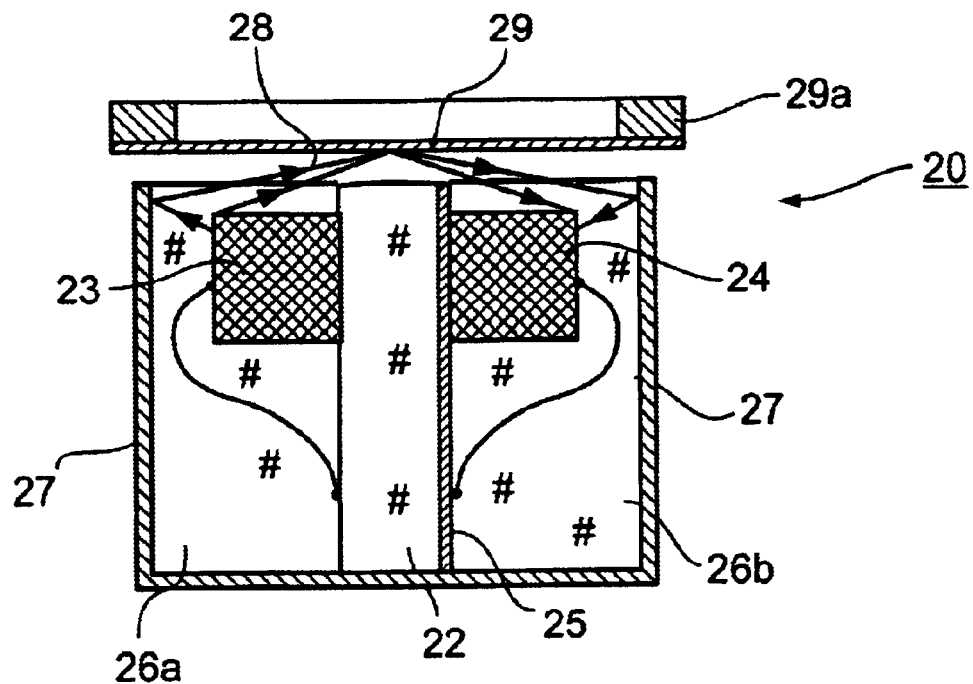
FIGS. 6 and 7 are views, corresponding to those of FIGS. 4 and 5, illustrating a construction of optical transducer made by another method in accordance with the present invention.
Figure 7:
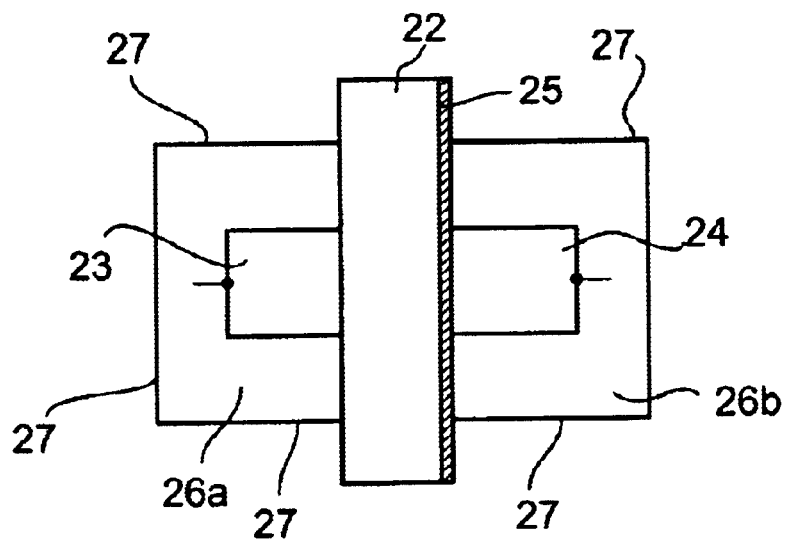

FIGS. 6 and 7 illustrate an optical transducer, therein generally designated 20, of similar construction as in FIGS. 2–5, and producible in basically the same manner as that optical transducer.

One difference in the optical transducer 20 illustrated in FIGS. 6 and 7 is that the light shielding layer, therein designated 25, is on the face of the transparent PCB 22 carrying the light detectors 24, rather than on the face carrying the light source 23 as in FIGS. 2–5. Another difference is that the transparent plastic potting materials 26a, 26b embedding the light source 23 and light detector 24, respectively, on the opposite faces of the PCB 22, are provided with flat outer faces rather than with curved outer faces so that the external light shielding layers 27 on the outer faces of the transparent plastic potting material 26a, 26b will be planar rather than curved.

In all other respects, the optical transducer illustrated in FIGS. 6 and 7 is constructed and produced in the same manner as described above with respect to FIGS. 2–5, and also includes the deformable membrane 29 mounted by mounting ring 29 to overlie the optical window 28 so as to vary the intensity of the light received by the light detector 24 from the light source 23 in response to the deformations of the membrane.

Figure 8:
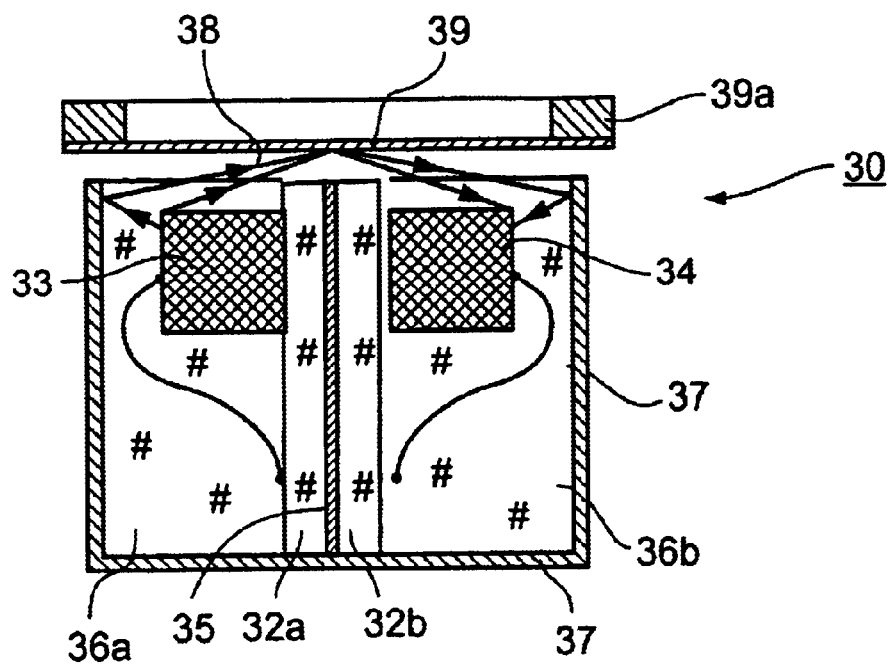
FIGS. 8 and 9 are views corresponding to those of FIGS. 4 and 5 but illustrating a construction of optical transducer made by yet another method in accordance with the present invention.
Figure 9:
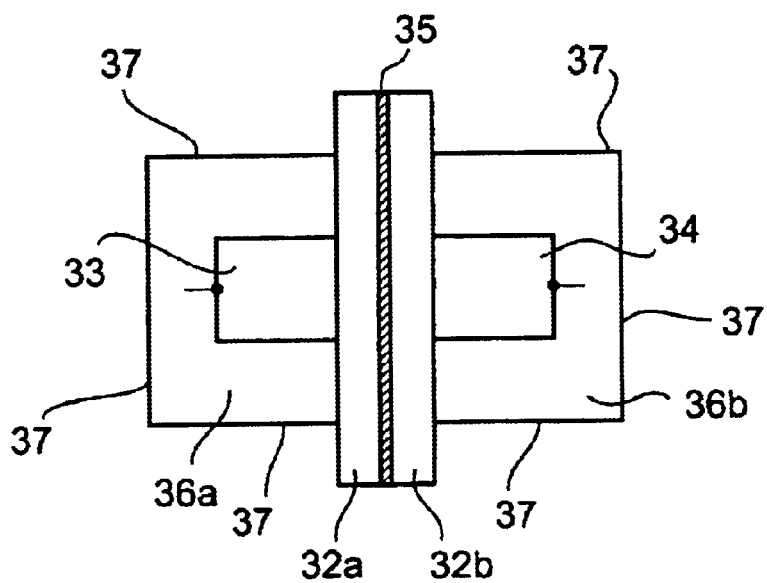

FIGS. 8 and 9 illustrate an optical transducer, therein generally designated 30, made according to a similar method as that described above with respect to FIGS. 2–5, so as to provide a sturdy construction producible in volume and at relatively low cost.

One difference in the construction illustrated in FIGS. 8 and 9 is that there are two base members, designated 32a, 32b, respectively, one for mounting the matrix of light sources 33, and the other for mounting the matrix of light detectors 34. Each matrix is embedded in a body of transparent plastic potting material 36a, 36b. The two base members 32a, 32b, which may also be PCBs of transparent material, are then bonded together in a back-to-back relation with a light shielding layer 35 between them, to produce the integrated structure which is cut up into the individual optical units.

It will thus be seen that in the optical units produced from such an integrated structure, the light shielding layer 35 serves the same function as light shielding layer 25 in the optical transducer 21 illustrated in FIGS. 6 and 7, as well as light shielding layer 5 in the prior art optical transducer of FIG. 1. Light shielding layer 35 therefore may be of the same light-reflecting material as those shielding layers.

After the integrated structure, including the matrix of light sources and light detectors, has been cut into individual optical units, the outer surface of each body 36a, 36b of transparent plastic potting material is coated with the reflecting coating 37 except for the optical window 38, as described above with respect to FIGS. 2 and 3. Deformable membrane 39 is then mounted by ring 39a over the optical window 38 of each optical unit as described above with respect to the optical transducers illustrated in FIGS. 2–7.

Figure 10:
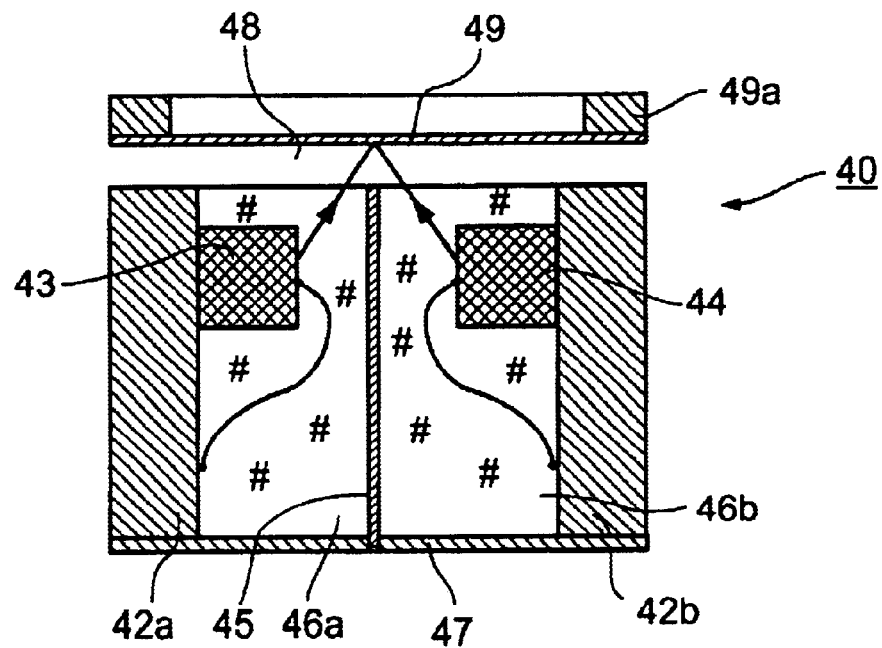
FIGS. 10 and 11 are views corresponding to those of FIGS. 4 and 5 but illustrating a construction of optical transducer made by yet another method in accordance with the present invention.
Figure 11:
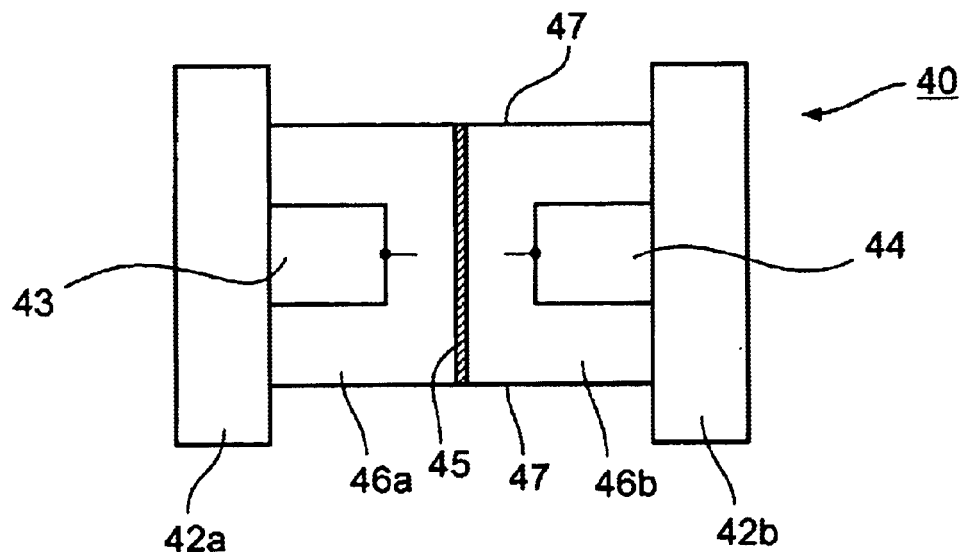

FIGS. 10 and 11 illustrate an optical transducer, therein generally designated 40, made by a similar method as described above, but differing in a number of respects.

The main difference in the method of producing the optical transducer 40 illustrated in FIGS. 10 and 11 is that although two base members 42a, 42b are also used as in optical transducer 30 illustrated in FIGS. 8 and 9, the two base members are bonded together not in a back-to-back relationship to produce the integrated structure, but rather in a face-to-face relationship, i.e., along the outer surfaces of the transparent plastic potting material bodies 46a, 46b, embedding the light sources 43 and light detectors 44.

Thus, as shown in FIGS. 10 and 11, the light sources 43 are mounted on a face of one PCB 42a, and the light detectors 44 are mounted on a face of the second PCB 42b. In this case, the two PCBs 42a, 42b need not be of transparent material; but if transparent, they are preferably provided with an external light-shielding coating (not shown) corresponding to coating 17 and 27 in FIGS. 4 and 6, respectively. The light sources 43 on PCB 42a are embedded in transparent plastic potting material body 46a, and the light detectors 44 on PCB 42b are embedded in transparent plastic potting material body 46b. The outer surfaces of one or both of the transparent plastic potting material bodies 46a, 46b are coated with the light-blocking coating 45 and bonded together with each light detector 44 in axial alignment with each light source 43.

After such an integrated structure has been cut along horizontal and vertical lines into the individual optical units, as described above with respect to FIGS. 2 and 3, the outer surface of one side of the bonded transparent plastic potting material bodies 46a, 46b is coated with the external light shielding layer 47, leaving the opposite side uncoated so as to define the optical window 48 aligned with the light source 43 and light detector 44. The deformable membrane 49 is then mounted by ring 49a to that end of the light unit such that deformations in the membrane will produce variations in the intensity of the light received by light detector 44, and thereby will be measurable by the changes in the electrical signal outputted via the electrical connection 44b from the light detector.

It will be seen that in the method for making optical transducers as illustrated in FIGS. 10 and 11, the light sources 43 and light detectors 44 are formed in a contiguous relation to each other on their respective base members 42a, 42b. It will also be seen that the two base members are bonded together with the outer faces of their respective bodies 46a, 46b of transparent plastic potting material in a face-to-face relation with each other, and with each light source 43 of base member 42a aligned with a light detector 44 of base member 42b in the transverse direction of the integrated structure produced by bonding the two base members.

FIGS. 12–17 illustrate yet another method of making optical transducers in accordance with the present invention. The method of FIGS. 12–17 is similar to that of FIGS. 10 and 11, except that, instead of forming the light sources and light detectors in a contiguous relation to each other on their respective base members, they are formed in a spaced relation to each other on their respective base members. In addition the two base members are bonded together to produce the integrated structure with the outer faces of the respective bodies of transparent plastic potting material in a nested relation (rather than in an abutting face-to-face relation as in FIGS. 10 and 11), with each body of one base member received in a space of the other base member. As in the method for producing the optical transducers of FIGS. 10 and 11, each light source of one base member in the method of FIGS. 12–17, is aligned with a light detector of the other base member in the transverse direction of the integrated structure produced by bonding the two base members together.

An optical transducer produced by the method of FIGS. 12–17 is illustrated in FIG. 16, and is therein generally designated 50.

As shown in FIG. 12, one base member, 52a, is formed with the light sources 53 in spaced rows, with a space between each row; and the other base member 52b is formed with the light detector 54 also in spaced rows, with a space between each row. The spaces in the rows formed in the two base members 52a, 52b are dimensioned so that those in each base member accommodate the light sources or light detectors, respectively, of the other base member.

FIG. 13 is a side view, and FIG. 14 is a front view, illustrating the integrated structure produced when the two base members are bonded together. As shown in FIG. 13, the two base members are bonded together with the outer faces of the respective bodies 56a, 56b of transparent plastic potting material in a nested relation to each other, such that body 56a of base member 52a is received within the spaces between bodies 56b of base member 52b, and vice versa.

FIG. 16 illustrates one optical transducer 50 produced from the integrated structure of FIGS. 12–15 after being cut-up into individual optical units as described above. Each so-produced optical unit is of basically the same construction as in the method described with respect to FIGS. 10 and 11. Thus, in the optical unit produced according to the method of FIGS. 12–15, the light source 53 of base member 52a is also aligned with the light detector 54 of base member 52b. Both are embedded in their respective bodies of transparent plastic potting material 56a, 56b, and optically separated from each other by the external light-blocking coating 57.

As in FIGS. 10 and 11, bodies 56a, 56b are coated with an external light-blocking coating 57 at one side, leaving the opposite side uncoated so as to define the optical window 58 of the respective optical unit. The deformable membrane 59 is then mounted to the optical unit by means of mounting ring 59a, in the same manner as described above with respect to FIGS. 10 and 11.

It will thus be seen that the method of FIGS. 12–17 also permits the optical units of the transducers to be produced in volume and at low cost, and also provides a very sturdy construction enabling them to withstand rough handling.

While the invention has been described with respect to several preferred embodiments, it will be appreciated that these are set forth merely for purposes of example, and that many other variations may be made. For example, in the method of FIGS. 12–17, the spacing between the light sources and light detectors in their respective base members may be along the vertical axis, rather than the horizontal axis, or may be along both axes so that each light source and light detector is bounded on its four sides by a space, rather than only on its two sides. In addition, the integrated structures may be constructed in the form a linear array of single rows, rather than a horizontal array of rows and columns. Further, the optical transducer could be used with displaceable members other than deformable membranes, e.g., for detecting and/or measuring displacements in accelerometers, pressure gauges, or the like.

Many other variations, modifications and applications of the invention will be apparent.

What is claimed is:

1. An optical transducer, comprising:

an optical unit including a light source, a light detector laterally spaced therefrom, and an optical window for outputting light from said light source and for transmitting to said light detector light reflected back from said light source;

said light source being carried on one face of a first base member;

said light detector being carried on one face of a second base member;

said first and second base members being bonded together with said light source and light detector facing, and in alignment with, each other and separated from each other by a transparent plastic potting material which embeds said light source and light detector.

2. The optical transducer according to claim 1, wherein each of said base members includes a block of said transparent plastic potting material embedding the light source or light detector, respectively, of the respective base member; said base members being bonded together along faces of their respective blocks of transparent plastic potting material.

3. The optical transducer according to claim 2, wherein said base members are bonded together along end faces of their respective blocks of transparent plastic potting material.

4. The optical transducer according to claim 2, wherein said base members are bonded together along side faces of their respective blocks of transparent plastic potting material.

5. The optical transducer according to claim 1, wherein said light source and light detector are optically shielded from the environment externally of the optical unit by light-blocking layers except for said optical window.

6. The optical transducer according to claim 1, wherein the optical transducer further comprises a deformable membrane in alignment with said optical window.

* * * * *